US012476302B2

(12) United States Patent
Garrick et al.

(10) Patent No.: US 12,476,302 B2
(45) Date of Patent: Nov. 18, 2025

(54) METHOD AND APPARATUS FOR HEAT TRANSFER IN A CYLINDRICAL BATTERY CELL

(71) Applicant: GM GLOBAL TECHNOLOGY OPERATIONS LLC, Detroit, MI (US)

(72) Inventors: Taylor R. Garrick, Bloomfield Hills, MI (US); Michael A. Lelli, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 790 days.

(21) Appl. No.: 17/870,150

(22) Filed: Jul. 21, 2022

(65) Prior Publication Data

US 2024/0030514 A1 Jan. 25, 2024

(51) Int. Cl.

*H01M 10/6556* (2014.01)
*H01M 10/613* (2014.01)
*H01M 10/643* (2014.01)
*H01M 10/6568* (2014.01)

(52) U.S. Cl.

CPC ..... *H01M 10/6556* (2015.04); *H01M 10/613* (2015.04); *H01M 10/643* (2015.04); *H01M 10/6568* (2015.04)

(58) Field of Classification Search

CPC ........... H01M 10/6556; H01M 10/613; H01M 10/643; H01M 10/6568; H01M 50/533; H01M 4/70; H01M 10/647; H01M 10/654; Y02E 60/10; Y02P 70/50

See application file for complete search history.

(56) References Cited

FOREIGN PATENT DOCUMENTS

| | | | | | |
|---|---|---|---|---|---|
| CN | 100423319 | C | * | 10/2008 | H01M 50/107 |
| CN | 101305492 | A | * | 11/2008 | H01M 8/2465 |
| CN | 114628771 | A | * | 6/2022 | H01M 4/747 |
| CN | 114824681 | A | * | 7/2022 | H01M 10/0422 |
| DE | 112016007076 | T5 | | 4/2019 | |
| DE | 102021104787 | A1 | | 11/2021 | |
| JP | 2001076759 | A | * | 3/2001 | Y02E 60/10 |
| JP | 2004259849 | A | * | 9/2004 | Y02E 60/10 |
| JP | 2012185912 | A | * | 9/2012 | Y02E 60/10 |
| WO | WO-2004075320 | A2 | * | 9/2004 | H01M 4/70 |
| WO | WO-2022063632 | A1 | * | 3/2022 | H01M 50/213 |

* cited by examiner

*Primary Examiner* — Kaity V Chandler
(74) *Attorney, Agent, or Firm* — Quinn IP Law

(57) ABSTRACT

An electrochemical battery cell includes a plurality of first electrodes, a plurality of second electrodes, a plurality of layers interleaved between and stacked in an electrode stack along a central stack axis with the first and second electrodes, a first current collector, and a second current collector. The second current collector includes an elongated cylinder and a fluidic coupler, the second current collector extends axially through the central stack cavity, and the second current collector includes a flow channel extending longitudinally between a first end and a second end.

19 Claims, 2 Drawing Sheets

METHOD AND APPARATUS FOR HEAT TRANSFER IN A CYLINDRICAL BATTERY CELL

INTRODUCTION

The concepts described herein relate to electrochemical energy storage battery cells, including stacked electrode designs for rechargeable cylindrical battery cells.

DC power sources, such as batteries, are electrochemical devices that may be employed to store and release electric power that may be employed by an electric circuit or an electric machine to perform work, such as for communications, display, or propulsion. Heat may be generated by the processes of converting electric power to chemical potential energy, i.e., battery charging, and converting chemical potential energy to electric power, i.e., battery discharging.

A lithium ion battery is an electrochemical device that operates by reversibly passing lithium ions between a negative electrode (or anode) and a positive electrode (or cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode.

Operating a DC power source such as a lithium ion battery outside of a desired temperature range may reduce battery service life. By way of example, lithium-ion technology may require operation within a temperature range between 20 C and 35 C to maximize service life of the battery. Operation of the lithium ion battery outside of this temperature range may accelerate aging of the battery, reduce the service life of the battery, and/or reduce the energy storage capacity thereof.

Battery cells, including rechargeable cylindrical battery cells, may generate heat during charging, discharging, and under other conditions such as rapid recharging. Furthermore, storage capacities of battery cells may be reduced under low ambient temperature conditions.

SUMMARY

There is a need to manage heat in a battery cell, or a battery cell pack containing multiple battery cells, under static conditions, and during charging and/or discharging to mitigate effects of temperature on aging, service life, and/or energy storage capacity. Furthermore, there are performance and durability benefits that may be achieved by controlling and/or managing heat in a battery cell.

The concepts described herein provide an electrochemical battery cell that includes a plurality of first electrodes each having a first active electrode material borne by a first body and a flexible first electrode tab projecting from the first body, a plurality of second electrodes each having a second active electrode material, distinct from the first active electrode material, borne by a second body and a flexible second electrode tab projecting from the second body, a plurality of separator layers and/or solid electrolyte layers interleaved between and stacked in an electrode stack along a central stack axis with the first and second electrodes, a first current collector, and a second current collector. The second current collector includes an elongated cylinder and a fluidic coupler that extends axially through the central stack cavity. The second current collector includes a flow channel extending longitudinally between a first end and a second end.

An aspect of the disclosure may include a fluidic coupler arranged at the first end and fluidly coupled to the flow channel of the second current collector.

Another aspect of the disclosure may include the flow channel being a circuit extending longitudinally between the first end and the second end and having an inlet and an outlet, wherein the fluidic coupler includes a first port fluidly coupled to the inlet and a second port fluidly coupled to the outlet.

Another aspect of the disclosure may include the flow channel being a single channel extending longitudinally between the first end and the second end, wherein the fluidic coupler is fluidly coupled to the single channel.

Another aspect of the disclosure may include the second current collector having an outer portion fabricated from an electrically conductive material.

Another aspect of the disclosure may include the second current collector being disposed inside the first current collector, aligned substantially parallel with the central stack axis, and having an interference fit with the second electrode tabs to thereby electrically connect to the second electrode.

Another aspect of the disclosure may include the first current collector encasing the electrode stack and interference fitting with the first electrode tabs to thereby electrically connect to the first electrode.

Another aspect of the disclosure may include the first and second bodies of the first and second electrodes each having a substantially flat annular shape.

Another aspect of the disclosure may include the first and second bodies having respective central holes coaxially aligned on the central stack axis to define a central stack cavity extending through of the electrode stack, wherein the second current collector includes an elongated electrically conductive bar extending axially through the central stack cavity.

Another aspect of the disclosure may include each of the second electrode tabs including a plurality of second electrode tabs projecting radially inward from an inner-diameter (ID) edge of the second body, circumferentially spaced around the second body, and bent against an outer surface of the electrically conductive bar of the second current collector.

Another aspect of the disclosure may include the second body of each of the second electrodes having an outer-diameter (OD) edge with a second layer of electrical insulation.

Another aspect of the disclosure may include the first current collector including an electrically conductive cylinder concentric with and surrounding the first and second electrodes.

Another aspect of the disclosure may include each of the first electrode tabs including a plurality of first electrode tabs projecting radially outward from an outer-diameter (OD) periphery of the first body, circumferentially spaced around the first body, and bent against an inner surface of the electrically conductive cylinder of the first current collector.

Another aspect of the disclosure may include the first body of each of the first electrodes having an inner-diameter (ID) edge with a first layer of electrical insulation.

Another aspect of the disclosure may include a rigid outer housing containing therein the electrode stack and the first and second current collectors.

Another aspect of the disclosure may include the outer housing including a main housing, a housing cap closing off an open end of the main housing, and a biasing member compressed between the electrode stack and the housing cap or the main housing.

Another aspect of the disclosure may include the second current collector including an electrically conductive plate extending longitudinally along a lateral side of the electrode stack, abutting the second electrodes, and in spaced relation to the first electrodes.

Another aspect of the disclosure may include the first current collector including an electrically conductive hollow container coaxial with and surrounding the first and second electrodes.

Another aspect of the disclosure may include an electrochemical battery cell that includes a plurality of first electrodes; a plurality of second electrodes; a plurality of layers interleaved between and stacked in an electrode stack along a central stack axis with the first and second electrodes; a first current collector; and a second current collector. The second current collector includes an elongated cylinder and a fluidic coupler; the second current collector extends axially through the central stack cavity; and the second current collector includes a flow channel extending longitudinally between a first end and a second end.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
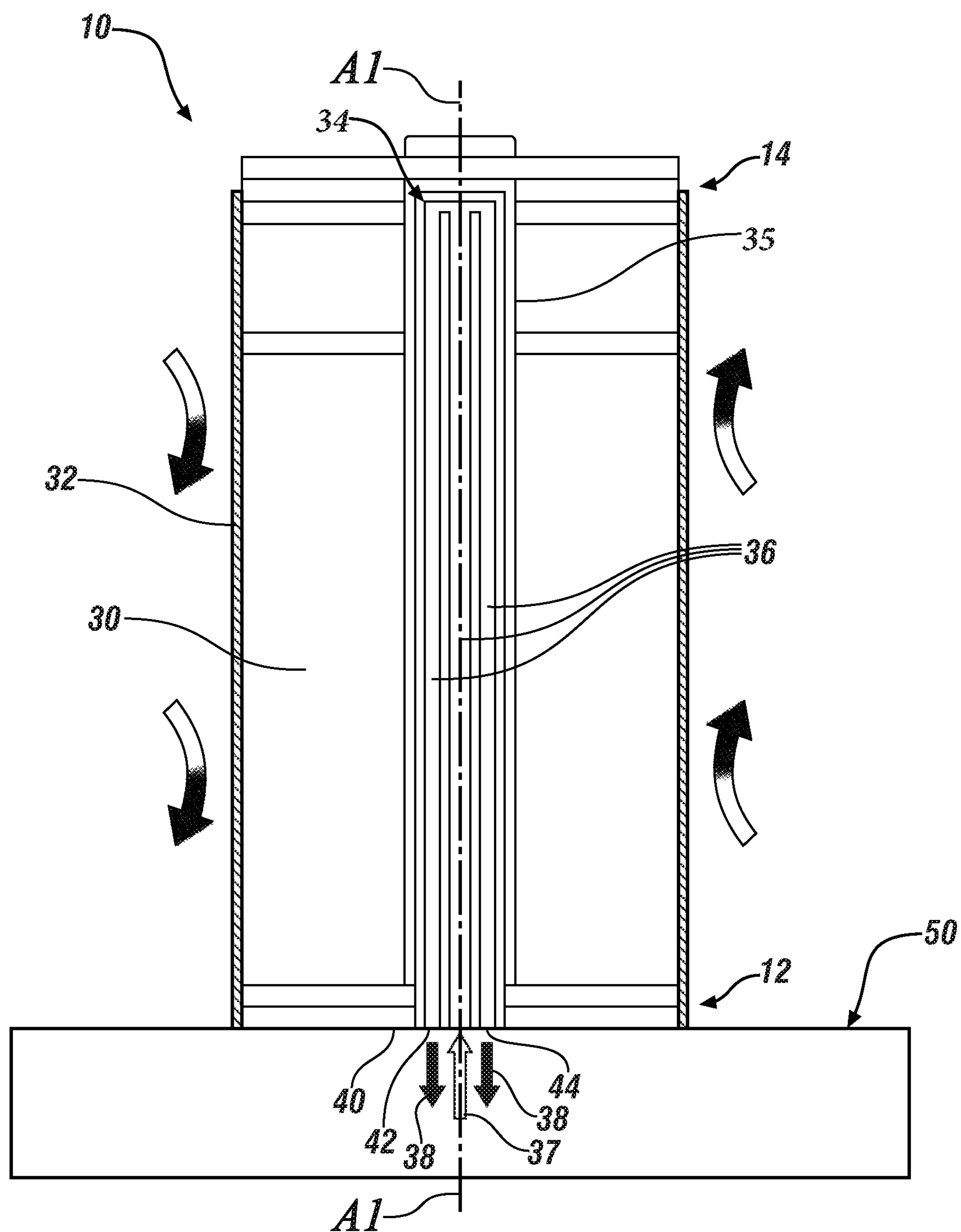
FIG. 1 schematically illustrates a side sectional view of a representative cylindrical battery cell, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The following detailed description is merely exemplary in nature and is not intended to limit the application and uses. Furthermore, there is no intention to be bound by any expressed or implied theory presented herein. It should be understood that throughout the drawings, corresponding reference numerals indicate like or corresponding parts and features.

The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIG. 1 schematically illustrates a side sectional view of a representative electrochemical device in the form of a cylindrical battery cell 10. The battery cell 10 includes an electrode stack 30 that is arranged between a first cylindrical current collector 32 and a second cylindrical current collector 34. The second current collector 34 is arranged as an elongated cylinder with a fluidic coupler 40 coupled on a first end 12. The second current collector 34 extends axially through a central stack cavity 35 in the electrode stack 30, wherein the central stack cavity 35 and the second current collector 34 are concentric to axis A1. The second current collector 34 includes a flow channel 36 that extends longitudinally between the first end 12 and a second end 14 of the second cylindrical current collector 34.

The fluidic coupler 40 fluidly couples to the flow channel 36. The fluidic coupler 40 is arranged to couple to a heat transfer system 50.

In one embodiment, the flow channel 36 is arranged as a circuit extending longitudinally between the first end 12 and the second end 14, with an inlet 37 and an outlet 38, and the fluidic coupler 40 includes a first port 42 fluidly coupled to the inlet 37 and a second port 44 fluidly coupled to the outlet 38.

Alternatively, the flow channel 36 is a single channel that extends longitudinally between the first end 12 and the second end 14 with the fluidic coupler 40 being fluidly coupled to the single channel.

The fluidic coupler 40 fluidly couples to the heat transfer system 50, which is arranged to circulate fluid, e.g., ethylene glycol coolant, to the flow channel 36 to effect heat transfer to/from the battery cell 10.

Figure 2A:
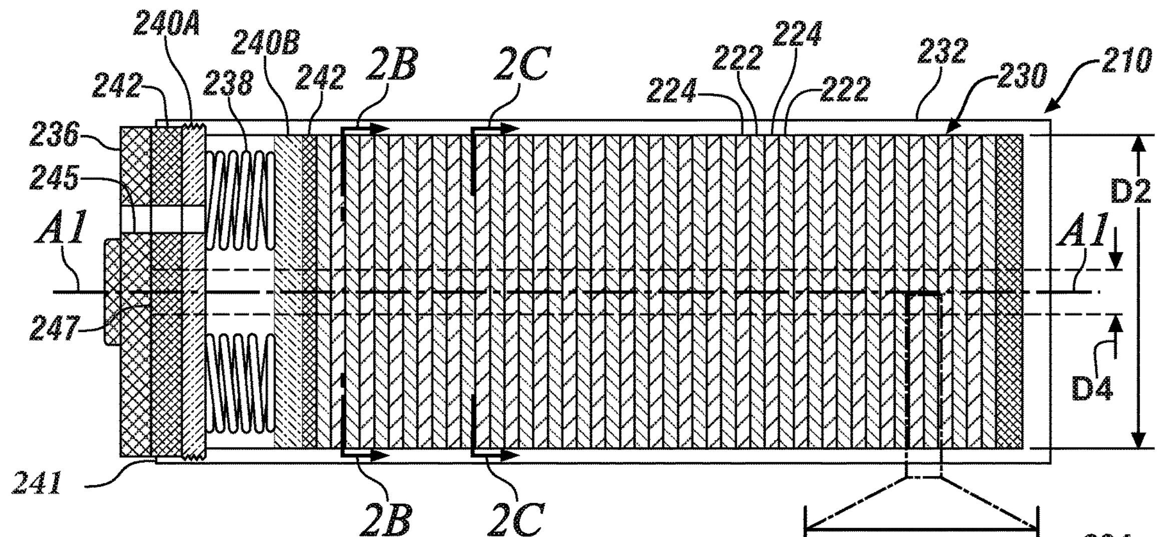
FIGS. 2A-2C are side-sectional view and two plan-sectional view illustrations, respectively, of a representative cylindrical battery cell with a stacked electrode architecture, in accordance with the disclosure.
Figure 2A:
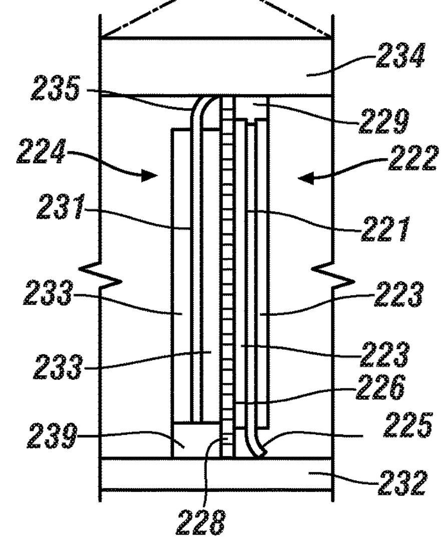
Figure 2B:
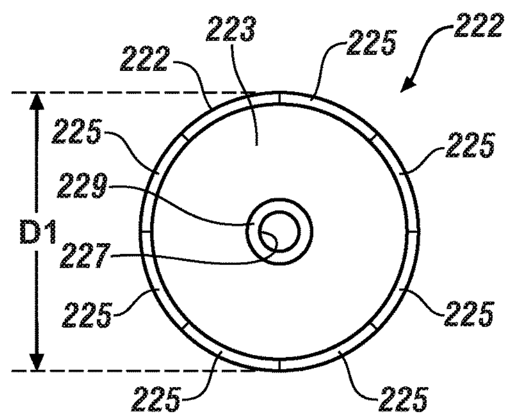

FIG. 2B is a plan-view illustration of one of the first electrodes (anodes) 222 in the electrochemical device 210, e.g., as if taken along section line 2B-2B of FIG. 2A. For simplicity of design and ease of manufacture, it may be desirable that all of the first anodes 222 are substantially structurally identical to one another, e.g., within acceptable manufacturing tolerances. Each anode 222 may be fabricated with a substantially flat, annular main body 221, which may be stamped, cut, or machined from an electrically conductive metallic material, such as aluminum or aluminum alloy. Two layers of active (anode) electrode material 223 are secured to the opposing major faces of the electrode's main body 221. The active electrode material 223 borne by main body 221 may comprise any commercially available options. The anode 222 is manufactured, in whole or in part, from a lithium metal, such as lithium-aluminum (LiAl) alloy materials with an Li/Al atomic ratio in a range from 0 at.wt. %≤Li/Al<70 at.wt. %, and/or aluminum alloys with Al atomic ratio >50 at.wt. % (e.g., lithium metal is smelt). Additional examples of suitable active anode materials include carbonaceous materials (e.g., graphite, hard carbon, soft carbon etc.), silicon, silicon-carbon blended materials (silicon-graphite composite), $Li4Ti5O12$, transition-metals (alloy types, e.g., Sn), metal oxide/sulfides (e.g., $SnO2$, FeS and the like), etc.

One or more flexible electrode tabs 225 (e.g., eight in the illustrated example) project radially outward from an outer-diameter edge of the electrode's main body 221. As shown, the electrode tabs 225 are integrally formed with the main body 221 as a single-piece structure. Covering an inner-diameter edge of the main body 221 is a coating of electrical insulation 229 that extends continuously around a central through-hole 227 of the main body 221.

For "anodeless" electrochemical device designs—with no anodes in their initial state—one or more negative electrodes function as a current collector while lithium from one or more cathodes are plated on and stripped from the negative current collector(s). Put another way, lithium ions may be extracted from the cathode(s) and electrodeposited as metallic lithium onto one or more current collectors during the initial charging process. During a subsequent discharging process, lithium ions may be stripped from the current collector and intercalated back into the cathode. Eliminating lithium metal at the anode side of the as-assembled batteries or fully discharged batteries reduces concerns stemming from the presence of large amounts of lithium metal in the cell.

Figure 2C:
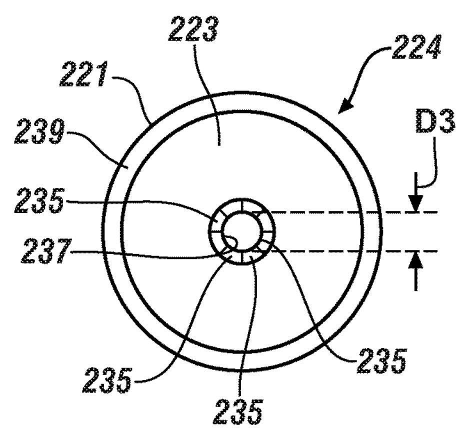

FIG. 2C is a plan-view illustration of one of the second electrodes (cathodes) 224 in the electrochemical device 210, e.g., as if taken along section line 2C-2C of FIG. 2A. Similar to the anodes 222, it may be desirable that all of the cathodes 224 are substantially structurally identical to one another. For instance, each cathode 224 may be fabricated with a substantially flat, annular main body 231, which may be stamped, cut, or machined from an electrically conductive metallic material. A layer of active (cathode) electrode material 233 is secured to each axially spaced, opposing major face of the electrode's main body 231. The active electrode material 233 borne by the cathode's main body 231 may comprise any commercially available options. By way of non-limiting examples, the cathode 224 material may include, for instance, lithium transition metal oxide, phosphate, or silicate, such as $LiMO2$ (M=Co, Ni, Mn, or combinations thereof); $LiM2O4$ (M=Mn, Ti, or combinations thereof), $LiMPO4$ (M=Fe, Mn, Co, or combinations thereof), and $LiMxM'2\text{-}xO4$ (M, M'=Mn or Ni). Additional examples of suitable active cathode materials include lithium nickel cobalt manganese oxide (NCM), lithium nickel cobalt aluminum oxide (NCA), lithium nickel cobalt manganese aluminum oxide (NCMA), and other lithium transition-metal oxides.

One or more flexible electrode tabs 235 (of, eight in the illustrated example) project radially inward from an ID edge of the electrode's main body 231. The electrode tabs 235 may extend continuously around a central through-hole 237 of the main body 231. As shown, the electrode tabs 235 are integrally formed with the main body 231 as a single-piece structure. Covering an OD edge of the main body 231 is a coating of electrical insulation 239. Alternatively, the insulations 229, 239 may be altogether eliminated and the associated electrode edges thereof spaced radially inward/outward from their non-mating collectors.

A substantially flat, ring-shaped separator 226 is sandwiched between each adjacent pair of electrodes 222, 224, as best seen in the inset view of FIG. 2A. These ring-shaped separators 226 may be fabricated as porous or microporous polymeric sheets that prevent physical contact of, yet allow ionic conductivity between, their respective pairs of electrodes 222, 224. Each of the porous polymeric separator sheets 226 may be soaked with a liquid electrolyte 228 that is suitable for conducting lithium ions. For electrochemical devices employing a solid electrolyte, the separator 226 may be a non-porous structure. It is envisioned that each separator 226 is a single-piece unitary structure.

Surrounding the stack 230 of electrodes 222, 224 and the interleaved separators 226 is a first lithium-ion (anode) current collector 232 that helps to pass electric current between complementary working electrodes. In accord with the illustrated example, the first current collector 232 may consist essentially of a rigid metallic cylinder, e.g., that is formed of stainless steel, aluminum, nickel, or copper. With this configuration, the first current collector 232 is concentrically aligned with and encases therein the first and second electrodes 222, 224. This electrically conductive cylinder may be a single-piece construction with a hollow, right-circular cylinder geometry having an open proximal end 241 that is longitudinally spaced from a closed distal end 243.

In this example, the first current collector 232 may function as the device's 210 protective outer housing for isolating and safeguarding the electrode stack 230. An optional housing cap 236 may rigidly mount to and closes off the open proximal end 241 of the first current collector 232. This housing cap 236 helps to secure the electrode stack 230 and other internal hardware of the electrochemical device 210 inside the current collector 232. To retain the electrode stack 230 under compression after assembly of the electrochemical device 210, a biasing member 238 applies pressure to one end of the stack 230. Although portrayed as a helical compression spring, biasing member 238 of FIG. 2A may take on any apt device that can apply compression, such as foam-type shims or cushions, leaf springs, hydraulic pressure devices, etc. For helical spring configurations, the biasing member 238 may be sandwiched between two disc-shaped polymeric spring plates: fixed spring plate 240A and movable spring plate 240B. Fixed spring plate 240A sits on an outboard side of the biasing member 238 and rigidly attaches to the first current collector 232, whereas the movable spring plate 240B sits on an inboard side of the biasing member 238 and slides axially within the first current collector 232. The biasing member 238 and plates 240A-B, in turn, are sandwiched between two disc-shaped layers of insulation 242; the stack-up of biasing member 238, plates 240, and insulation 242 are trapped between the housing cap 236 and electrode stack 230. An active or passive vent device 245 may optionally extend through the housing cap 236 and adjoining insulation layer 242 and spring plate 240A.

Anodes 222 mechanically interface with the first current collector 232 through a folding-tab interference fit to electrically connect the first current collector 232 to its corresponding set of electrodes 222. With reference again to FIG. 2A and the inset view presented therewith, the outer diameter D1 of the anodes 222 is larger than the inner diameter D2 of the anode current collector 232. Additionally, each of the outwardly projecting electrode tabs 225 is sufficiently flexible such that pressing the electrode stack 230 into the first current collector 232, or pressing the first current collector 232 onto the stack 230, along a central stack axis A1-A1 causes the tabs 225 to bend against circular opening at the proximal end 241 of the first current collector 232. Once bent, the tabs 225 slide along and press into an interior wall of the current collector 232 to thereby electrically connect the electrodes 222 to the first current collector 232. To obviate the chances of a short circuit, the layer of electrical insulation 239 on the outer perimeter of the second (cathode) electrodes 224 helps to electrically isolate the electrodes 224 from the first current collector 232.

Packaged inside the first current collector 232 is a second lithium-ion permeable (cathode) current collector 234 that is aligned substantially parallel with the central axis A1-A1 of the electrode stack 230. In accord with the illustrated example, the second current collector 234 may consist essentially of a rigid metallic bar, e.g., that is formed of stainless steel, aluminum, nickel, or copper. This electrically conductive bar may be a single-piece construction with an elongated and solid, right-circular cylinder geometry that is secured within a central stack cavity 247 that extends through the center of the electrode stack 230. With this configuration, the second current collector 234 is coaxially aligned with and seats inside the electrode stack 230.

Cathodes 224 mechanically interface with the second current collector 234 through a folding-tab interference fit in order to electrically connect the second current collector 234 to its corresponding set of electrodes 224. The inner diameter D3 of the cathodes 224 is smaller than the outer diameter D4 of the cathode current collector 234. Additionally, each of the inwardly projecting electrode tabs 235 is sufficiently flexible such that pressing the electrode stack 230 onto the cathode current collector 234 and/or pressing the second current collector 234 into the central through-holes 237 defining the central stack cavity 247 along a central stack axis A1-A1 causes the tabs 235 to bend against a proximal end of the second current collector 234. Once bent, the tabs 235 slide along and press against an exterior surface of the cathode current collector 234 to thereby electrically connect the electrodes 224 to the cathode current collector 234. To obviate the chances of a short circuit, the layer of electrical insulation 229 on the inner perimeter of the first (anode) electrodes 222 helps to electrically isolate the electrodes 222 from the current collector 234.

The concepts described herein provide a cooling channel in a cylindrical battery cell that allows for rapid heat rejection, such as may occur during a fast charging event, or during track or racing use. This cooling channel can also be utilized to mitigate thermal propagation under certain scenarios. This cooling channel considers liquid flow in the space typically utilized by the mandrel, and takes advantage of the cooling benefit of a stacked cylindrical cell compared to a wound cylindrical cell.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An electrochemical battery cell, comprising:

a plurality of first electrodes each having a first active electrode material borne by a first body and a flexible first electrode tab projecting from the first body;

a plurality of second electrodes each having a second active electrode material borne by a second body and a flexible second electrode tab projecting from the second body; and a plurality of separators; wherein the plurality of first electrodes, the plurality of second electrodes, and the plurality of separators are stacked in an electrode stack along a central stack axis wherein the plurality of first electrodes, the plurality of second electrodes, and the plurality of separators define a central stack cavity;

a first current collector; and a second current collector;

wherein the second current collector includes an elongated cylinder and a fluidic coupler;

wherein the second current collector extends axially through the central stack cavity;

wherein the second current collector is disposed inside the first current collector is aligned in parallel with the central stack axis, and has an interference fit with the second electrode tabs to electrically connect to the second electrodes; and wherein the second current collector includes a flow channel extending longitudinally between a first end and a second end.

2. The electrochemical battery cell of claim 1, further comprising a fluidic coupler arranged at the first end and fluidly coupled to the flow channel of the second current collector.

3. The electrochemical battery cell of claim 2, wherein the flow channel comprises a circuit extending longitudinally between the first end and the second end and having an inlet and an outlet; and wherein the fluidic coupler includes a first port fluidly coupled to the inlet and a second port fluidly coupled to the outlet.

4. The electrochemical battery cell of claim 2, wherein the flow channel comprises a single channel extending longitudinally between the first end and the second end; and wherein the fluidic coupler is fluidly coupled to the single channel.

5. The electrochemical battery cell of claim 1, wherein the second current collector includes an outer portion fabricated from an electrically conductive material.

6. The electrochemical battery cell of claim 1, wherein the first current collector encases the electrode stack and interference fits with the first electrode tabs to thereby electrically connect to the first electrodes.

7. The electrochemical battery cell of claim 1, wherein the first and second bodies of the first and second electrodes each has a substantially flat annular shape.

8. The electrochemical battery cell of claim 7, wherein the first and second bodies have respective central holes coaxially aligned on the central stack axis to define the central stack cavity extending through the electrode stack, and wherein the second current collector includes an elongated electrically conductive bar extending axially through the central stack cavity.

9. The electrochemical battery cell of claim 8, wherein each of the second electrode tabs includes a plurality of second electrode tabs projecting radially inward from an inner-diameter (ID) edge of the second body, circumferentially spaced around the second body, and bent against an outer surface of the electrically conductive bar of the second current collector.

10. The electrochemical battery cell of claim 9, wherein the second body of each of the second electrodes has an outer-diameter (OD) edge with a second layer of electrical insulation.

11. The electrochemical battery cell of claim 1, wherein the first current collector includes an electrically conductive cylinder concentric with and surrounding the first and second electrodes.

12. The electrochemical battery cell of claim 11, wherein each of the first electrode tabs includes a plurality of first electrode tabs projecting radially outward from an outer-diameter (OD) periphery of the first body, circumferentially spaced around the first body, and bent against an inner surface of the electrically conductive cylinder of the first current collector.

13. The electrochemical battery cell of claim 12, wherein the first body of each of the first electrodes has an inner-diameter (ID) edge with a first layer of electrical insulation.

14. The electrochemical battery cell of claim 1, further comprising a rigid outer housing containing therein the electrode stack and the first and second current collectors.

15. The electrochemical battery cell of claim 14, wherein the outer housing includes a main housing, a housing cap closing off an open end of the main housing, and a biasing member compressed between the electrode stack and the housing cap or the main housing.

16. The electrochemical battery cell of claim 1, wherein the second current collector includes an electrically conductive plate extending longitudinally along a lateral side of the electrode stack, abutting the second electrodes, and spaced in relation to the first electrodes.

17. The electrochemical battery cell of claim 1, wherein the first current collector includes an electrically conductive hollow container coaxial with and surrounding the first and second electrodes.

18. An electrochemical battery cell, comprising:

a plurality of first electrodes;

a plurality of second electrodes having a plurality of second electrode tabs;

a plurality of layers interleaved between and stacked in an electrode stack along a central stack axis with the first and second electrodes, wherein the plurality of layers form a central stack cavity;

a first current collector; and a second current collector;

wherein the second current collector includes an elongated cylinder and a fluidic coupler;

wherein the second current collector extends axially through the central stack cavity;

wherein the second current collector is disposed inside the first current collector, is aligned parallel with the central stack axis, and has an interference fit with the plurality of second electrode tabs to electrically connect to the plurality of second electrodes; and wherein the second current collector includes a flow channel extending longitudinally between a first end and a second end.

19. The electrochemical battery cell of claim 18, further comprising a fluidic coupler arranged at the first end and fluidly coupled to the flow channel of the second current collector;

wherein the flow channel comprises a circuit extending longitudinally between the first end and the second end and having an inlet and an outlet; and wherein the fluidic coupler includes a first port fluidly coupled to the inlet and a second port fluidly coupled to the outlet.

* * * * *